United States Patent
Arnalsteen et al.

(10) Patent No.: US 8,118,051 B2
(45) Date of Patent: Feb. 21, 2012

(54) VALVE FOR THE VENTING CIRCUIT OF A LIQUID TANK

(75) Inventors: Michel Arnalsteen, Groot-Bijgaarden (BE); Vincent Cuvelier, Brussels (BE); Patrice Baudoux, Flavy le Martel (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 531 days.

(21) Appl. No.: 12/161,353

(22) PCT Filed: Sep. 8, 2006

(86) PCT No.: PCT/EP2006/066157
§ 371 (c)(1),
(2), (4) Date: Feb. 17, 2009

(87) PCT Pub. No.: WO2007/085309
PCT Pub. Date: Aug. 2, 2007

(65) Prior Publication Data
US 2010/0224262 A1 Sep. 9, 2010

(30) Foreign Application Priority Data
Jan. 26, 2006 (FR) .................... 06 00801

(51) Int. Cl.
*F16K 24/04* (2006.01)
(52) U.S. Cl. ......................... 137/202; 137/43
(58) Field of Classification Search .............. 137/39, 137/43, 202, 587
See application file for complete search history.

(56) References Cited

U.S. PATENT DOCUMENTS

| 1,628,069 A | 5/1927 | Schmidt et al. |
| 4,796,593 A | 1/1989 | Woodcock et al. |
| 5,044,389 A | 9/1991 | Gimby |

(Continued)

FOREIGN PATENT DOCUMENTS
EP 1112886 A1 7/2001
(Continued)

OTHER PUBLICATIONS
PCT Search Report mailed Nov. 30, 2006 for International Application No. PCT/EP2006/066157 (4 p.).
(Continued)

*Primary Examiner* — Craig Schneider
*Assistant Examiner* — Craig J Price
(74) *Attorney, Agent, or Firm* — Oblon, Spivak, McClelland, Maier & Neustadt, L.L.P.

(57) ABSTRACT

Valve for the ventilation circuit of a liquid tank, comprising:
a) a chamber comprising a base, a side wall and a cover;
b) at least two independent ventilation orifices in the chamber cover connecting the chamber to the venting circuit;
c) at least one orifice in the chamber side wall connecting the chamber to the inside of the tank;
d) at least two independent concentric floats, each comprising an apex capable of sealing one of the ventilation orifices, each being able to slide vertically inside the chamber depending on the liquid level in the chamber and to rest on the chamber base when the chamber is empty; one of the floats being calibrated so as to seal one of the ventilation orifices at one liquid level L1 in the tank and the other float being calibrated so as to seal the other ventilation orifice at a level L2 above L1.

9 Claims, 2 Drawing Sheets

U.S. PATENT DOCUMENTS

| | | | |
|---|---|---|---|
| 5,313,978 A * | 5/1994 | Takaki et al. | 137/43 |
| 5,413,137 A | 5/1995 | Gimby | |
| 5,443,561 A | 8/1995 | Sakata et al. | |
| 5,687,756 A | 11/1997 | Vannatta et al. | |
| 5,971,002 A | 10/1999 | Turpin | |
| 5,992,441 A | 11/1999 | Enge et al. | |
| 6,026,853 A | 2/2000 | Osterbrink | |
| 6,058,963 A | 5/2000 | Enge et al. | |
| 6,158,456 A | 12/2000 | Enge | |
| 6,230,732 B1 | 5/2001 | Ganachaud et al. | |
| 6,336,466 B1 | 1/2002 | Ganachaud et al. | |
| 6,412,511 B1 | 7/2002 | Rosseel | |
| 6,591,855 B2 * | 7/2003 | Nishi et al. | 137/202 |
| 6,779,546 B2 * | 8/2004 | Hattori | 137/202 |
| 6,959,720 B2 | 11/2005 | Kurihara et al. | |
| 7,219,683 B2 * | 5/2007 | Furuya et al. | 137/202 |
| 2002/0011265 A1 | 1/2002 | Ganachaud et al. | |
| 2002/0112757 A1 | 8/2002 | DeCapua et al. | |
| 2003/0098063 A1 * | 5/2003 | Mori et al. | 137/202 |
| 2005/0229967 A1 | 10/2005 | Ueki | |
| 2006/0266415 A1 | 11/2006 | Ganachaud et al. | |
| 2009/0211649 A1 * | 8/2009 | Miura et al. | 137/202 |

FOREIGN PATENT DOCUMENTS

| | | |
|---|---|---|
| FR | 2625284 A1 | 6/1989 |
| FR | 2896568 A1 | 7/2007 |
| JP | 2021086 A | 1/1990 |
| WO | WO0053960 A1 | 9/2000 |
| WO | WO2006125751 A1 | 11/2006 |
| WO | WO2006125752 A1 | 11/2006 |
| WO | WO2006125758 A1 | 11/2006 |
| WO | WO2007085585 A1 | 8/2007 |
| WO | WO2007122168 A1 | 11/2007 |
| WO | WO2008028887 A1 | 3/2008 |
| WO | WO2008028894 A1 | 3/2008 |
| WO | WO2008031830 A1 | 3/2008 |

OTHER PUBLICATIONS

Search Report dated Nov. 20, 2006 from the Institut National De La Propriete Industrielle for French Application No. 0600801 (2 p.).

* cited by examiner

VALVE FOR THE VENTING CIRCUIT OF A LIQUID TANK

CROSS-REFERENCE TO RELATED APPLICATIONS

This application is a U.S. national stage application under 35 U.S.C. §371 of International Application No. PCT/EP2006/066157, filed Sep. 8, 2006, which claims priority to French Application No. 0600801, filed Jan. 26, 2006, all of which are hereby incorporated by reference in their entirety for all purposes.

The present invention relates to a valve for the venting (ventilation) circuit of a liquid tank, in particular a fuel tank with which a motor vehicle may be equipped.

Liquid tanks, particularly fuel tanks for motor vehicles, are currently fitted, amongst other things, with a venting circuit. This circuit allows air to be introduced into the tank in the event of underpressure (in particular to compensate for the volume of liquid consumed) or allows gases contained in the tank to be removed in the event of overpressure (particularly in the event of overheating). This circuit also allows the gases that have to be discharged into the atmosphere to be routed and possibly filtered for the purpose of meeting the increasingly strict environmental requirements in this area. This filtering is generally carried out using an activated carbon filter, also known as a "canister".

Conventional venting circuits therefore comprise valves and pipes intended to convey the gases between the tank and the canister, or even also between the tank and the pipe head. These valves must provide a rapid and reliable response when their operating conditions arise, but with minimal sensitivity to transient phenomena such as in particular very high flow rates, overpressure in the tank or low-amplitude waves. They must also ensure that there is minimal liquid carried over into the canister (or the chamber containing a substance, usually activated carbon, which adsorbs the fuel vapours) in normal operation and when filling, for fear of saturating said canister and making the decontamination of the gases discharged into the atmosphere ineffective. This phenomenon is generally called LCO (Liquid Carry Over) in the jargon of the field.

The flow rate of the gases conveyed by the ventilation systems from the tank to the canister can vary: typically, it is considerably greater during filling than during normal operation of the vehicle (when being driven or at rest). The ventilation systems must therefore preferably be able to accommodate these two types of flow rates.

Furthermore, preferably, they are equipped with a device that makes it possible to fix the maximum fill level of the tank by shutting off the fill nozzle at the end of fully filling the tank. Although a simple tube for recirculating the vapours to the pipe head that has one open end is suitable, some motor vehicle manufacturers (especially in North America) use a valve to fulfill this function. Such a valve is generally known as an FLVV (Fill Limit Vent Valve) and it generally comprises a float having an apex that is capable of sealing a connection orifice between the tank and the venting circuit when the maximum fill level is reached, thus causing the pressure in the tank to increase and the fill nozzle to shut off.

With a view to allowing the ventilation of the tank at this maximum fill level, it is known to equip the tank with, in addition to an FLVV, a separate valve, preferably equipped with a device that prevents LCO in the event of a vehicle rolling over, waves, etc. Such a valve is generally known as a ROV (roll-over valve). It generally also comprises a float and the device that gives it its ROV function is generally either a heavy ball or a calibrated spring. Generally, this valve is a separate valve to the FLVV valve. However, it is advantageous (especially with a view to reducing the number of parts and ventilation orifices) for one and the same valve to be capable of fulfilling these two functions.

Thus, document U.S. Pat. No. 5,443,561 proposes a valve that fulfils both the functions of an FLVV and of maximum level ventilation with a ROV, said valve being equipped with two floats that are either parallel, or concentric and superposed, associated with two independent orifices. However, these valves are of a particular type, known as "dry seal" valves in the jargon of the field. This is understood to mean that the seal used to close off the orifice is at a considerable distance from the maximum fill level. This results in a loss of active volume in the tank. The ROV float in this type of valve does not have any function in the event of waves; it is only of use in the event of actual vehicle roll-over.

It should be noted that FLVV valves that fulfill a function other than that of ventilation at the maximum level have also been proposed, and this also being with the aid of a second float associated with a second orifice, independent of the first. Thus, a valve that allows a round-up filling (or a round-up function) is proposed in documents U.S. Pat. No. 6,959,720 and US 2005/0229967. However, these valves use two parallel floats sliding in a chamber equipped with a partition, which has the drawback of substantial bulkiness. Moreover, a chamber with partitioning is more difficult to produce (especially if it is made by injection-moulding plastic).

The objective of the present invention is therefore to solve these problems by providing a valve that simultaneously has the advantage of compactness, of being easy to produce (manufacture) and of being able to fulfill two different functions effectively, without loss of working volume in the tank.

The invention thus relates to a valve for the ventilation circuit of a liquid tank, comprising:
a) a chamber comprising a base, a side wall and an upper wall;
b) at least two independent ventilation orifices made in the upper wall of the chamber and connecting it to the venting circuit;
c) at least one orifice made in the side wall of the chamber and connecting it to the inside of the tank;
d) at least two independent floats each comprising an apex capable of sealing one of the ventilation orifices, said floats:
   being able to slide vertically inside the chamber depending on the liquid level in the latter and resting, when the chamber is empty, on its base;
   being calibrated so that one of the floats seals one of the ventilation orifices at one liquid level L1 in the tank and so that the other float seals the other ventilation orifice at a level L2 above L1; and
   being concentric.

Surprisingly, although the floats are concentric and can be moved in the same chamber, without a partition, they actually operate, however, independently and enable the valve according to the invention to be multifunctional while at the same time being very compact and easy to manufacture.

The valve according to the invention is intended for the venting circuit of a tank which may contain any liquid. In particular, the liquid may be a fuel, a brake fluid or a lubricant. More particularly, the liquid is a fuel. The tank may be intended for any use, especially for equipping a vehicle and more especially still for equipping a motor vehicle.

The valve according to the invention comprises a chamber of any shape, usually of constant internal cross section. It preferably has a substantially cylindrical internal cross section. Its side wall is pierced by at least one orifice allowing the flow of gases present in the tank above the liquid. The term "gas" is understood in particular to mean the external air that has to be introduced into the tank or the gas mixtures contained in the tank, the removal of which has to be possible. In the case of a fuel tank, these gas mixtures comprise essentially air, and fuel vapour.

The upper wall of the chamber of the valve according to the invention is itself pierced by at least two separate (independent) orifices, each intended to be sealed by a different float. These orifices may have the same size. However, preferably, these orifices are of different sizes. This is because, particularly when one of them is intended, with its float, to fulfill an FLVV function (i.e. to allow ventilation while filling and to cause the nozzle to shut off), and the other, a subsequent function (for example: second shutting off of the nozzle or ventilation just after filling, at the maximum fill level in the tank), the one intended for the FLVV function preferably has a larger cross section with a view to providing a greater ventilation flow rate when filling than when operating (see the preamble of the application). It should be noted that in this case, associated with this orifice having a larger cross section may be a device for controlling the flow rate (or flow management valve) such as that described in Application FR 06/00801, to which the present application claims priority, and the content of which is incorporated by reference in the present application.

The main chamber of the valve according to the invention also includes a base used as a support for the floats when the latter are in the bottom position. The support for the float may be of any known type. It is preferably an apertured plate. The term "apertured" is understood to mean having several openings that allow liquid to flow through the plate in order to allow the float to fulfill its function.

According to a first variant, these openings are designed so that when the liquid level rises in the tank, this liquid can penetrate into the valve through these openings, force the float upwards and seal the ventilation orifices via the apexes of the valves. Satisfactory behaviour (purge efficiency) is observed with orifices having areas greater than or equal to 5 mm$^2$, or even 10 mm$^2$.

In this case, advantageously, the main chamber preferably comprises several calibrated side openings of small dimensions, in order to let only the gases pass through and to prevent the flow of substantial volumes of liquid, in particular by throttling. Each opening typically has an area between 10 and 20 mm$^2$. There is therefore generally a total area of between 20 and 40 mm$^2$ since a configuration with two diametrically opposed apertures is preferred.

In particular, the side openings have an elongated rectangular cross section. Advantageously, there are at least two of these openings. This is because a single aperture could be blocked (by liquid fuel) at the moment when the valve reopens, for example when the tank is tilted. In this case, the risk of liquid fuel being carried over is very high, since the pressure has risen in the tank and, upon reopening, the gas flow rate is high. Complete blockage is avoided with at least two diametrically opposed orifices.

Positioning gas flow openings in the upper part of the chamber very substantially reduces the possible impact on these openings of the liquid level and of its movements, thus allowing venting even in certain critical situations. This impact may also, when required, be reduced by the use of at least one external baffle placed facing some of the opening(s) and preferably all of them.

This may be a single baffle having a substantially annular cross section, surrounding the head of the valve. Alternatively, it is possible to use a succession of baffles, each facing one or more openings. Preferably, it is a single baffle, preferably one that is annular and provided with openings. This is because, preferably, the valve according to the invention has a very high closure height (i.e. close to the upper wall of the tank) in order to use the storage volume of the tank to the maximum. This means that a passage for the gases is provided sufficiently high up on the valve. However, the presence of the external baffle has the effect of lowering the uppermost entry point into the valve. To allow the use of this baffle while having a high closure height, openings are made in this baffle. Thus, when the fuel level is very high, there is still a small passage through the slots of the baffles in order for venting of the tank to continue. Preferably, these openings are in the form of vertical slots and preferably are made starting from the bottom of the external baffle.

The external baffle preferably comprises at least two diametrically opposed openings, preferably offset with those of the chamber and in particular staggered with respect to them.

According to a second variant, which is preferred, the openings in the plate are designed to prevent significant liquid penetration during the rise of the liquid level in the tank. In this variant, advantageously, the side wall of the chamber comprises at least one opening of sufficient size for liquid to penetrate into the chamber. Preferably, and as described in the aforementioned US documents, this opening is located at a level above or equal to that at which one of the floats seals its orifice and, also preferably, that at which the second float seals its orifice. It therefore constitutes what is known as an overflow aperture. In this variant, the orifices present in the base have a drainage role when the liquid level in the tank drops below that of the overflow aperture (this level being that of the lower edge of the opening).

This variant is advantageous in that not only, as explained in said US documents, it makes it possible to prevent inopportune closures of the valve, but in addition, the positioning of this aperture (and in particular, its lower edge) conditions the level at which the nozzle first shuts off, which may therefore be high, which makes it possible to gain in working volume of the tank.

In a first subvariant, the openings in the plate have a limited size which prevents significant liquid penetration during the rise of the liquid level in the tank. Good results have been observed with 1 to 2 openings of 1 to 2 mm in diameter (typically, 1.5 mm).

In a second subvariant, which is preferred, the openings in the plate have a sufficient size to allow liquid to penetrate into the chamber, but are equipped with non-return valves that prevent this penetration but that favour the drainage of the chamber when the liquid level in the tank drops below that of the plate. Such non-return valves are, for example, described in the aforementioned US documents.

The valve according to the invention also comprises two floats, each comprising an apex intended for sealing a corresponding ventilation orifice. The term "apex" should be taken in the broad sense: relief capable of sealing the orifice in a leaktight manner and that is preferably—but not necessarily—based on an elastomer. Preferably therefore, the apex is or comprises a seal. According to the invention, these two floats are concentric and, preferably, they have a generally cylindrical outer shape (like the cross section of the chamber in which they slide). Preferably, the axis of these two floats coincides with the axis of the chamber and, in this case, only the central float can have its apex in the same axis, that of the peripheral float having to be off-set (since the two orifices which they are intended to seal cannot be on the same axis). In this case, generally, the central float is substantially cylindrical and the peripheral float is substantially annular.

The present invention gives good results with floats fulfilling, for one, an FLVV function and, for the other, another function. Preferably, this other function consists of a ventilation after filling or a round-up filling. In this variant, the diameter of the FLVV orifice is preferably larger than the diameter of the other orifice and the waterline of the FLVV float in its closure position is below the waterline of the float fulfilling the other function in its closure position, this being because the other function concerns an event which is after the first shutting off of the nozzle.

In the case where one of the floats provides an FLVV function, it is preferably the peripheral float for weight reasons. This is because, since the FLVV float must have a lower waterline, it is easier for the heavier float to play this role.

In the valve according to the invention, the peripheral float preferably comprises slits so that when it rests in the top position, some air passages remain.

When the second function of the valve according to this variant of the invention is a round-up function, the corresponding orifice is preferably "open" (i.e. it can only be sealed by its float in its top position, and is open in the absence thereof), and it preferably has a smaller size than that of the FLVV orifice, these two orifices being calibrated as a function of the pressure at which the nozzles shut off. This is because, during the filling process, the valve must be able to vent at a high flow rate through the larger size (FLVV) orifice up until the first shutting off of the nozzle, which takes place when the corresponding float seals the FLVV orifice. Then, the valve may continue to vent through the second orifice, which has a smaller size and will give rise to a second shutting off of the nozzle when it will in turn be sealed by its float.

When the second function of the valve is a ventilation after filling, the second orifice is preferably equipped with a moveable closure member, separate from the float, and calibrated so that it only lifts up at a given pressure, above the pressure at which the nozzles shut off so that the valve can provide both its FLVV function and said function. This is because, during the filling process, this valve must be able to vent at a high flow rate through the larger size (FLVV) orifice up until the nozzle shuts off, which takes place when the corresponding float seals the FLVV orifice. Since the second orifice is sealed, round-up filling is not possible but, on the other hand, this second orifice will provide ventilation of the tank when the pressure in the latter is sufficient to lift up said closure member (its orifice moreover not being sealed by its float since its waterline in the closure position is at a level above the maximum fill level). Moveable closure members that are particularly suitable are those in the form of optionally perforated balls or discs.

In the valve according to the invention, the floats do not have, as such, the function of preventing ingress of liquid in the event of a vehicle rolling over or being excessively tilted (ROV or Roll-Over Valve function). This function must therefore, where appropriate, be provided by independent devices or by additional means combined with the valve. Preferably, these are calibrated springs which, in the event of tilting, waves and/or rolling-over of the tank, push the floats towards their closure position. These springs are generally inserted between the floats and the base of the chamber, and they are preferably calibrated (like their corresponding float) differently (in order to obtain different sealing levels). In order to obtain a given closure level, the couple (float weight—spring) must be adapted (for the spring, k (force constant), free length, initial compression, diameter of the wire can be adapted).

The constituent elements of the valve may be made of any material. Preferably, they are based on a thermoplastic. In this case, it is obviously convenient to choose the material or materials in such a way that they withstand the operating stresses. Of course, the materials chosen must be inert with respect to the liquids with which they have to be in contact, in particular inert with respect to fuels.

In particular in the case in which the liquid tank is a fuel tank made of plastic, most of the constituent elements of the valve according to the invention are also made of plastic. The term "plastic" is understood to mean any polymeric synthetic material, whether thermoplastic or thermosetting, which is in the solid state under ambient conditions, as well as blends of at least two of these materials. The intended polymers comprise both homopolymers and copolymers (especially binary or ternary copolymers). Non-limiting examples of such copolymers are: random copolymers, linear block copolymers, non-linear block copolymers, and graft copolymers. Thermoplastic polymers, including thermoplastic elastomers, and blends thereof are preferred.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, the valve according to the invention may be made of polyolefins, grafted polyolefins, thermoplastic polyesters, polyketones, polyamides and copolymers thereof.

One polymer often used in plastic fuel tanks is polyethylene, in particular high-density polyethylene (HDPE) possibly in a multilayer structure including a barrier layer (for example based on EVOH, or hydrolysed ethylene/vinyl acetate copolymer) or one with a surface treatment (fluorination or sulphonation for example) for the purpose of making it impermeable to the fuels for which it is intended. Consequently, when the valve according to the invention includes a cover, this is preferably based on HDPE too, in order to be able to be welded to the tank. As for the other parts of the valve, they are preferably based on at least one hydrocarbon-impermeable plastic. Non-limiting examples of such hydrocarbon-impermeable plastics are: polyethylene terephthalate or polybutylene terephthalate, polyamides, polyketones and polyacetals. It should be noted that all these parts, the cover included, may be multilayer structures, comprising, for example, at least one high-density polyethylene layer and optionally a hydrocarbon barrier layer (on the surface or within said structures).

In the case of a plastic fuel tank, and in particular one based on HDPE, good results have been obtained with valves, including a cover, based on HDPE, (so as to be able to be welded to the wall of the tank and in particular, to the perimeter of an opening in it), and a chamber and a float made of POM (polyoxymethylene) or PBT (polybutylene terephthalate).

These figures represent a venting valve comprising a flow management device (FMV) as mentioned previously. This device is integrated into a valve comprising a chamber (5) which opens into the inside of the tank (not represented) via at least one inlet orifice (6) which is located in the upper part of the side wall of the chamber. This valve is furthermore connected, on one side, via a cover (2) to the fill pipe head (not represented) via the line (3) and to a canister (not represented) via a ventilation line (4).

Figure 1:
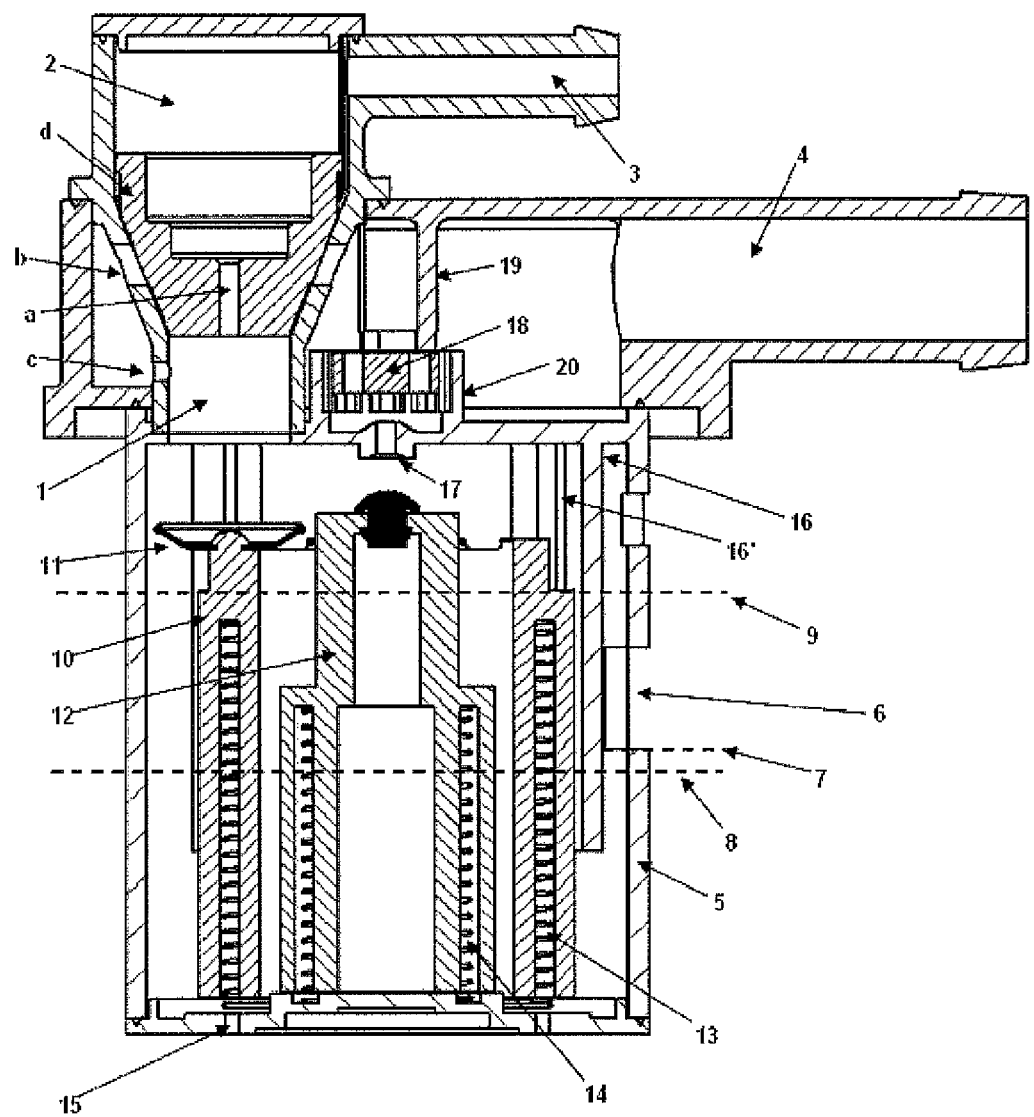
FIG. 1 represents a vertical cross section through a valve that incorporates several preferred variants of the present invention.
Figure 2:
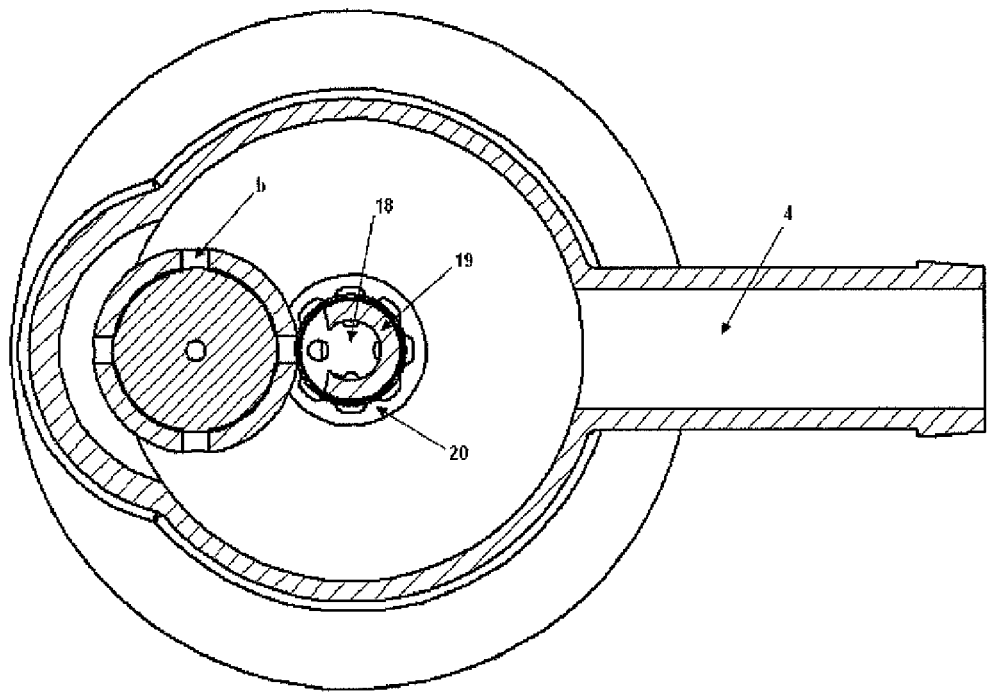
FIG. 2 represents the same valve, as a horizontal cross section through its upper part.
Figure 3:
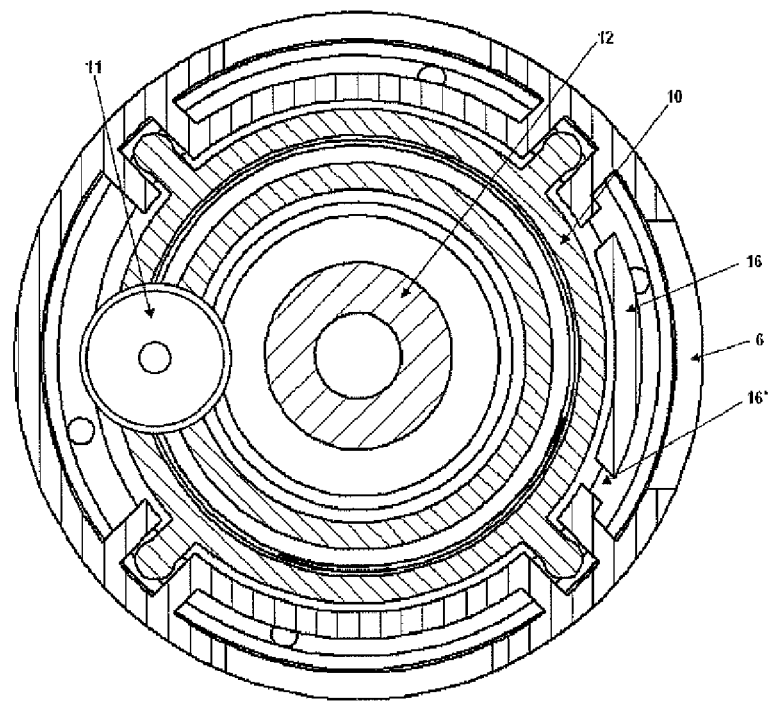
FIG. 3 still represents the same valve, but as a horizontal cross section through its lower part.

The lower end (7) of the orifice (6) corresponds to the level of liquid in the tank at the time of the first shutting off of the fill nozzle. In actual fact, the valve illustrated comprises three side openings (6) (which are visible in FIG. 3), and also an internal baffle (16) located opposite these openings and that is itself pierced with openings (16') that allow liquid to penetrate into the inside part of the chamber.

A float (10), represented in the bottom position and equipped with a seal (11), can slide vertically in the chamber (5). The float (10) and seal (11) are capable of sealing, in a leaktight manner, the lower part (1) of a chamber for control of the FMV device in the top position of the float (10), i.e. when the latter has reached its waterline in the top position and/or when the tank is overturned. The lower level marked by a dotted line (8) corresponds to the waterline of the main float (10) in the bottom position. The fuel level when the float is in the top position (and seals its seat) is equal to the level (8) plus the travel of the float (which is around 10 mm).

This valve comprises a second float or secondary float (12), which is concentric to and inside the main float (10) and is capable, in the top position, of sealing an outlet orifice (17) of the chamber that leads directly into a chamber for connection to the ventilation line (4). The upper level marked by a dotted line (9) corresponds to the waterline of the secondary float (12) in the bottom position.

In the variant represented, due to the presence of a disc (18), the liquid level in the tank at the time of sealing the orifice (1) cannot be exceeded since as soon as it is reached all the outlets from the chamber (orifice 17 and end of the tubular part (1)) are sealed. The pressure therefore rises in the tank and immediately causes the nozzle to shut off, with no possibility of a "round up". The disc (18) is provided with perforations in its peripheral part, for the purpose of facilitating the opening and closure dynamics of the orifice (17). The movement of this disc is guided by a lower casing (20) and upper lugs (19) which act as a stop.

The floats (10), (12) are calibrated using springs (13), (14), which also provide an ROV function in the event of the tank rolling over, of the vehicle parking on a slope, of waves, etc. They ensure that the floats (10), (12) are pushed towards their respective seats (1), (17) during these events.

Finally, the chamber (5) comprises a base provided with small purge openings (15) through which the liquid which has penetrated into the chamber (5) is discharged when the liquid level in the tank drops below the level where this base is located.

This valve operates in the following manner: in normal operation (as illustrated), i.e. when the level in the tank is below the level delimited by the base of the valve and when the fill pipe head is sealed, the conical float (d) is immobile since the pressure on both sides of it is identical. Hence, venting occurs solely through the orifice (c) (which connects the inside of the tank to the canister via the ventilation line (4) and the orifices (6)) and sporadically through the orifice (17) when the opening pressure of the disc (18) (typically between 30 and 50 mbar) is reached. During the filling process, the pressure in the tank rises and lifts up the closure member (d), which by so doing unblocks the orifices (b) to allow ventilation towards the canister at a higher flow rate. At the same time, the liquid level in the tank rises until reaching the side openings (6) and penetrating into the chamber (5). The main float (10) will then rise and the seal (11) will end up sealing the lower part of the pipe (1) and cause the nozzle to shut off.

From this moment, over-filling is impossible as the disc (18) seals the orifice (17), hence causing a pressure increase which automatically shuts off the nozzle. The preloading of this disc (18) is such that in operation it allows any overpressure in the tank to be relieved (by lifting up when a certain pressure is exceeded, which depends on its preloading).

If the orifice (17) were not to be provided with such a disc (18), over-filling would be possible and the fuel level could rise until the secondary float (12) seals the orifice (17) (after a travel of around 5 mm) and thereby causing the final shutting off of the nozzle.

In the event that the valve were not to be provided with the orifice (c) as represented, in operation the ventilation would be provided by the orifice (17) alone. Such a valve would operate as follows:

FLVV version with "round up" function (without disc (18)): at the start of the filling process the air can only escape via the orifice (17); the pressure therefore rapidly increases and the closure member (d) lifts up. Following the filling process, the closure member (d) seals the orifices (b) and only the orifice (17) allows ventilation;

FLVV version with ventilation after fully filling up (with disc (18)): as soon as filling starts, all the orifices (the orifices (b) and the orifice (17)) are sealed and the pressure increases; the closure member (d) therefore lifts up. When the vehicle is being driven, the closure member (d) seals the orifices (b); ventilation therefore only occurs via the orifice (17) and only sporadically, when the preloading pressure of the disc is reached.

It follows from the foregoing that the valve according to this variant of the invention can be used equally well with a disc (18) as without it, and with or without an orifice (c), depending on the manufacturers' specifications. Such a valve is therefore versatile.

The invention claimed is:

1. A valve for the ventilation circuit of a liquid tank, comprising:
   a) a chamber comprising a base, a side wall and an upper wall, the base of the chamber including an apertured plate that comprises openings, the openings in the apertured plate being designed to prevent significant liquid penetration during a rise of a liquid level in the tank, the side wall of the chamber including at least one opening of sufficient size and location for liquid to penetrate into the chamber;
   b) at least two independent ventilation orifices made in the upper wall of the chamber and connecting the chamber to the venting circuit;
   c) at least one orifice made in the side wall of the chamber and connecting the chamber to an inside of the tank; and
   d) at least two independent floats each comprising an apex capable of sealing one of the ventilation orifices, said floats:
      being located inside the chamber without a partition between the at least two independent floats;
      being able to slide vertically inside the chamber depending on the liquid level in the chamber and resting, when the chamber is empty, on its base;
      being calibrated so that one of the floats seals one of the ventilation orifices at one liquid level L1 in the tank and so that the other float seals the other ventilation orifice at a level L2 above L1; and
      being concentric.

2. The valve according to claim 1, wherein the two ventilation orifices have different sizes.

3. The valve according to claim 2, wherein a device for controlling flow rate is associated with the ventilation orifice of the two ventilation orifices that has a larger size orifice than the other of the two ventilation orifices.

4. The valve according to claim 1, wherein the openings in the apertured plate have a limited size which prevents significant liquid penetration during the rise of the liquid level in the tank.

5. The valve according to claim 1, wherein the axis of the floats coincides with the axis of the chamber.

6. The valve according to claim 1, wherein one of the floats is capable, with the corresponding orifice of the one of the floats, of providing a Fill Limit Vent Valve function, and the other float is capable, with the corresponding orifice of smaller diameter of the other float, of providing a second function selected from the group consisting of a ventilation after filling and a round-up filling.

7. The valve according to claim 6, wherein the second function of the valve is a round-up filling; wherein the orifice fulfilling the second function is "open"; and wherein the two orifices are calibrated as a function of the pressure at which a fill nozzle shuts off.

8. The valve according to claim 6, wherein the second function of the valve is a ventilation after filling, and wherein the second orifice is equipped with a moveable closure member calibrated so that the movable closure member only lifts up at a given pressure, above a pressure at which a fill nozzle shuts off.

9. The valve according to claim 1, wherein springs are inserted between the floats and the base of the chamber, and wherein the springs and the floats corresponding to each respective spring are calibrated differently.

* * * * *